Dec. 10, 1968   E. A. HAWK, SR   3,415,450
POWDER SUPPLY CONSTRUCTION FOR SPRAY TORCH
Filed May 24, 1966
FIG. 1.
FIG. 2.
FIG. 2a.
FIG. 3.
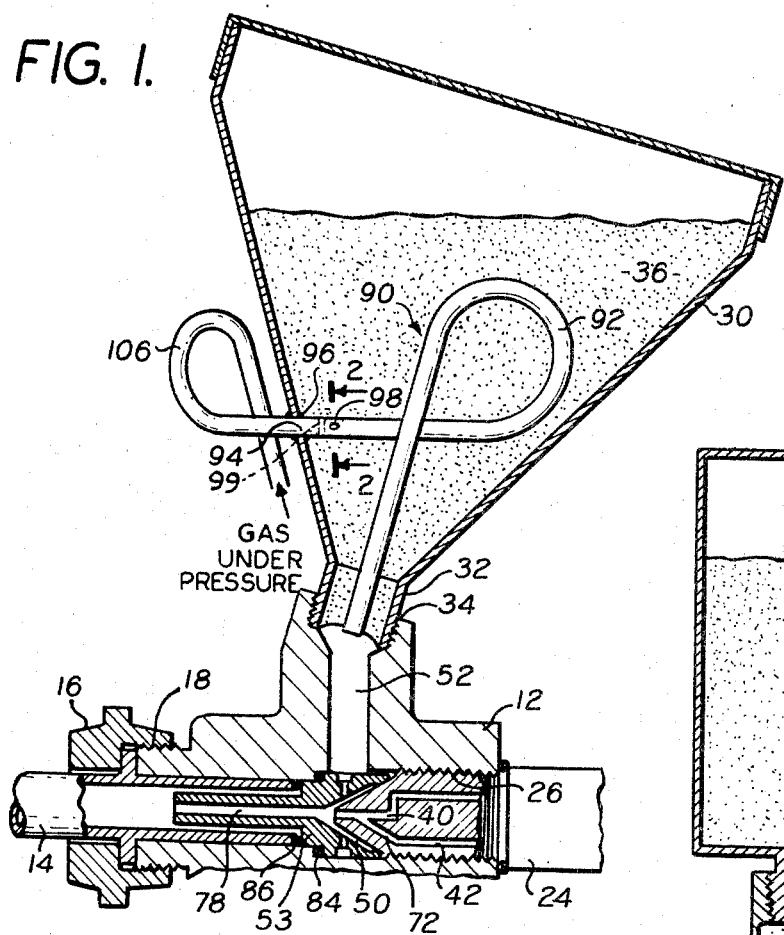
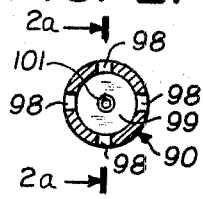
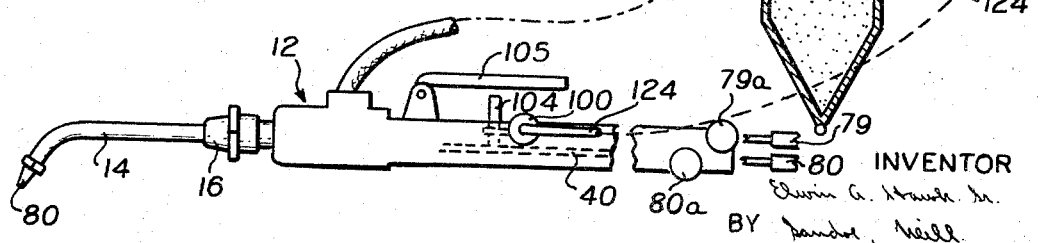
INVENTOR
Elvin A. Hawk, Sr.
BY
ATTORNEYS.

United States Patent Office 3,415,450
Patented Dec. 10, 1968

3,415,450
POWDER SUPPLY CONSTRUCTION
FOR SPRAY TORCH
Elwin A. Hawk, Sr., East Rochester, Ohio, assignor to
Coast Metals, Inc., Little Ferry, N.J., a corporation of
Delaware
Filed May 24, 1966, Ser. No. 552,623
9 Claims. (Cl. 239—85)

ABSTRACT OF THE DISCLOSURE

This is a spray torch for applying powdered hard-surfacing material to the heated surface of a work piece. The powdered metal is in a container on the torch, or at a location where it is connected with the torch by a flexible tube, and the container is higher than the torch with a loop in the passage through which the powder flows to the torch. This loop prevents free flow by gravity when no powder flow is wanted. A controlled gas flow through the powder passage, including the loop, is used to carry the powder around the loop to obtain powder flow to the torch. The gas is preferably one of the gases used for spraying the torch.

Brief description of the invention

This invention relates to torches and powder containers for supplying powder to the torch for discharge with the flame jets of the torch against a work piece on which the powdered material is to be applied as a surface. The invention is intended primarily for torches where the powder is fed into the interior of the torch for discharge through the flame jet orifices of the torch tip; but the broader aspects of the invention are applicable to torches which have the powder discharged into the burning gas streams of the torch beyond the tip face.

One type of torch has a hopper carried by the torch body and this provides an easily portable arrangement. The powder is fed by gravity, usually with some assistance from an aspirator in the torch, and the flow is influenced by changes in the orientation of the torch, since this changes the position of the hopper. Another combination employs a powder holder at a fixed location, for example on a wall, with a flexible tube connecting the powder holder with the torch. Feed of the powder with this arrangement is also influenced by movement of the torch into different positions with respect to the stationary powder holder.

It is an object of this invention to provide improved means for supplying powder from a holder to a torch and to obtain a powder feed that is substantially independent of the orientation of the torch for changes in the position of the torch with respect to a powder holder at a fixed location.

Another object is to provide a powder holder with a delivery conduit located in the holder itself and into which powder will fall regardless of the orientation of the powder holder or the torch, and to control the delivery of the powder through the conduit by means of a carrier gas stream.

Still another object is to control the delivery of powder to a torch without the use of any valve in the powder passage. In the preferred embodiment of the invention this result is attained by having a loop in the powder delivery passage between the powder inlet and the powder discharge end of the passage so that for any orientation of the powder holder, there is always some part of the passage that is higher than another part to stop gravity flow of powder.

Other objects, features and advantage of the invention will appear or be pointed out as the description proceeds.

Brief description of the drawings

In the drawing, forming a part hereof, in which like reference characters indicate corresponding parts in all the views:

FIGURE 1 is a diagrammatic view, mostly in section, showing a torch with a hopper carried by the torch body and having a powder feed made in accordance with this invention;

FIGURE 2 is a greatly enlarged sectional view on the line 2—2 of FIGURE 1;

FIGURE 2a is a sectional view taken on the line 2a—2a of FIGURE 2; and

FIGURE 3 is a diagrammatic view showing a modified form of the invention when used with a powder container supported at a fixed location.

Description of the preferred embodiments

The torch shown in FIGURE 1 includes a body 12 having a tip 14 connected to its forward end by a tip nut 16 which screws over threads 18 on the front end of the body 12.

The body 12 has an extension 24 screwed into a counterbore 26 at the back of the body. A hopper 30 has a threaded lower end 32 that screws into another socket 34 in the top of the body 12. This hopper holds powder 36 which is fed into the torch in a manner which will be explained.

Within the body 12 there is a center passage 40 for oxygen or other combustion-supporting gas. There is another passage 42 for fuel gas. The oxygen passage 40 discharges through a nozzle 50 of an aspirator.

This nozzle 50 is surrounded by an annular space into which a powder passage 52 opens. The powder passage extends through the upper part of the body 12 and through an opening in an element 53. Flow of oxygen from the nozzle 50 creates a partial vacuum in the annular space around the nozzle 50 and thus produces a suction on the powder passage 52.

There is a sloping passageway 72 leading from the fuel gas passage 42 into the center oxygen passage 40. This sloping passageway 72 converges with the passage 40 in the direction of the gas flow through the center passage, and fuel gas from the passage 42 flows into the center passage of the mixer through the sloping passageways 72 to exert an aspirator action which produces a partial vacuum in the center passage if there is no oxygen being supplied to the center passage. If oxygen is flowing in the center passage, then the action of the fuel gas jets flowing through the sloping passageway 72 is to increase the oxygen flow.

Beyond the sloping passageway 72 the gases enter a space which serves as a mixing chamber 78 and the gases flow with sufficient turbulence to insure thorough mixing as they travel through the chamber 78 and through the tip 14 on their way to a tip face 80 (FIGURE 3) from which they are discharged through one or more orifices in the usual way.

The oxygen and fuel gas are supplied to the torch through hoses 79 and 80, respectively; and the flow of the gases into the torch is controlled by valves 79a and 80a which are preferably adjusted to obtain a carburizing flame for preheating. When the powder is supplied in an oxygen stream as the carrier, the added oxygen produces a neutral flame.

The mixer element 53 and tip 14 have sealing rings 84 and 86, preferably O-rings, for preventing leakage of gases within the torch. Since the fuel gas is turned on first, the aspirator action of the sloping passageways 72 prevents any fuel gas from flowing back into the oxygen passage or into the powder passage during normal operation of the torch. When the oxygen is turned on, the aspirator nozzle 50 creates a suction which further prevents any flow of gases in the torch back into the powder passage 52 of the hopper.

The hopper 30 contains a tube 90 which has its lower end secured in the discharge end of the hopper in position to deliver powder 36 into the powder passage 52. This tube 90 extends upwardly in the hopper 30 and has a loop section 92 beyond which the tube 90 extends through an opening 94 in a side wall of the hopper 30 at a substantial distance below the top of the hopper. The drawing shows the tube 90 secured to the hopper wall by solder 96 which is merely representative of a connection between the tube and the side wall of the hopper.

Near the opening 94 there is an opening or orifice 98 in the wall of the tube 90, and this orifice 98 is large enough to permit powder to fall into the tube 90 by gravity. In order always to have an orifice 98 in position for free flow of powder by gravity into the tube, regardless of the orientation of the hopper, there are four orifices 98 located at equally angular spacing around the circumference of the tube, as shown in FIGURE 2.

Gravity flow of powder into the orifices 98 is not relied upon to control the rate of powder supply, however, and there is a partition 99 (FIG. 2a) in the tube 90 on the upstream side of the orifices 98. A short tube 101 extends through the partition 99 to a region just beyond the orifices 98. Flow of gas from the tube 101 exerts an aspirator action that draws powder into the tube 90 through the orifices 98.

The upstream end of the tube 90, after it extends through the opening 94 in the wall of the hopper, passes rearwardly on the torch to a connection where it communicates with an oxygen discharge port preferably supplied with oxygen from the same source that supplies oxygen to the center passage 40. This control is similar to that shown in FIGURE 3 where a tube 124 corresponds to the tube 90 of FIGURE 1. This connection 100 communicates with the oxygen passage 40 of the torch through a port commanded by a valve designated generally by the reference character 104 and operated by a handle 105. When this valve 104 is open, oxygen flows through the tube 124; and in the case of FIGURE 1, through the tube 90 to carry powder from the orifices 98 through the tube 90 to the powder passage 52.

The tube 90 preferably has another loop 106 on the upstream side of the orifice 98 so that powder cannot flow back from the hopper into the portion of the tube 90 which leads to the oxygen supply passage. The loop 92 prevents powder from flowing by gravity from the orifice 98 to the powder passage 52. Although a bend in the tube 90, to create a portion higher than the orifice 98, would prevent flow of powder by gravity beyond the bend, it is advantageous to have a complete loop at the bend because with a loop, there is always some part of the loop which is higher (regardless of orientation) than another part of the tube nearer to the orifices 98 and which will, therefore, prevent gravity flow of powder.

FIGURE 3 shows a modified construction in which a powder container 120 is mounted at a fixed location by a bracket 122. There is a tube 124 in the powder container 120. This tube 124 could extend through the bottom of the container as in FIGURE 1 but in the FIGURE 3 construction the tube 124 has its downstream end extend through an opening 126 in the wall of the container, and has its upstream end extend through a similar opening 128 in the wall on the opposite side of the powder container 120.

There are orifices 130 in the tube 124 corresponding to the orifices 98 shown in FIGURE 2. The upstream end of the tube 124 is connected to an oxygen supply port, which may be the port 102 on the torch. It will be understood that the oxygen may be supplied from other sources but it is convenient to have the valve which controls the powder-carrying gas located on the handle of the torch.

The downstream side of the tube 124 is bent to form a loop 134 and there is a flexible hose 136 leading from the loop 134 to the powder passage in the torch which may be the same as the construction described in FIGURE 1.

The powder container 120 in FIGURE 3 is of relatively small capacity, and is constructed with a threaded opening 140 at its upper end. A powder bottle 144 is screwed into the threaded opening 140 and this supplies a substantial quantity of powder to the container 120. When the bottle 144 is empty, it can be replaced by another similar bottle, and there is enough powder in the container 120 to permit continuous operation of the torch while powder bottles are being changed.

A small tube 148 leads from the tube 124 upward through the opening 140 to a location near the top of the inside of the powder bottle 144 and gas flows up through the tube 148 to equalize the pressure above the powder 36 in the bottle 144 and container 120. With fluffy powders, the tube 148 is unnecessary since gas from the orifices 130 permeates up through the powder to maintain equalization of the pressure in the powder container and the bottle. There is a valve 150 in the tube 148. This valve is adjustable as a further control on the rate of feed of the powder 36 from the bottle 144 and container 120.

The preferred embodiments of the invention have been illustrated and described, but changes and modifications can be made and some features can be used in different combinations without departing from the invention as defined in the claims.

What is claimed is:

1. A spray torch with a powder holder located at a level above the torch, a powder tube leading from the holder to the torch and having a part of its length within the powder holder and having an inlet orifice in said part, another part of the tube that extends downward for delivering powder to the torch at a level below the powder holder, and an intermediate part of the tube between the inlet and the downward extending delivery part of the tube, said intermediate part having a loop therein that extends higher than the inlet orifice to prevent flow of powder through the tube by gravity, and a gas supply line leading from a source of gas under pressure to said powder tube upstream of said inlet orifice for blowing powder around the loop.

2. The combination described in claim 1 characterized by the loop in the intermediate part of the tube being higher than the inlet orifice by a distance at least as great as several times the diameter of the tube.

3. The combination described in claim 1 characterized by the powder holder being carried on the torch and the loop being oriented on the torch whereby there is some part of the loop higher than some other part of the tube regardless of the tilting of the torch and powder holder at large angles from a position in which the axis of the powder holder is substantially vertical, and the tube having a plurality of orifices at angularly spaced locations around the circumference of the tube so that powder can drop into the tube through one of the orifices regardless of the orientation of the powder holder.

4. The combination described in claim 3 characterized by the powder tube extending downward through an opening in the bottom of the powder holder, and the intermediate loop portion of the tube being also located in the powder holder.

5. The combination described in claim 4 characterized by a portion of the tube upstream from the inlet extending through a wall of the powder holder to the outside thereof, and the inlet including an orifice through the side of the tube at a location that is below the intended powder level of the powder holder when used with powder in the powder holder.

6. The combination described in claim 4 characterized by the powder holder being a hopper carried by a torch body and the powder tube having its lower end communicating with the interior of the torch body, and a passage through which mixed oxygen and fuel gas flow to flame jet orifices of a tip connected with the torch body, and the gas supply line with which the upstream end of the powder tube is connected being the oxygen supply line.

7. The combination described in claim 6 characterized by the torch body having valve means associated with it for adjusting the flow of oxygen and fuel gas to obtain a carburizing flame for pre-heating, and means for controlling the oxygen flow that carries the powder to obtain a neutral flame when powder is supplied to the flame with the additional oxygen that carries the powder.

8. The combination described in claim 1 characterized by the powder holder being closed at its upper end and a vent pipe having its upper end opening into the space at the upper end of the powder holder and having its lower end at a location where it receives gas for equalizing pressure above the powder with the pressure in the space to which the powder must fall as it is supplied from the powder holder to a torch.

9. The combination described in claim 1 characterized by the powder holder having means for supporting it in a fixed location on a wall, and the powder passage including a flexible hose leading from the powder holder, a torch to which the powder is supplied, means through which oxygen is supplied to the tube upstream from the powder inlet orifice, the torch having a passage through which gases flow to flame jet orifices of the torch tip, the powder and the carrier gas for the powder being supplied to said passages through which gases flow to the flame jet orifices.

References Cited

UNITED STATES PATENTS

| | | | |
|---|---|---|---|
| 2,233,304 | 2/1941 | Bleakley | 239—80 |
| 2,408,058 | 9/1946 | Gallagher | 222—193 |
| 2,451,422 | 10/1948 | Wagner. | |

FOREIGN PATENTS 263,739  12/1949  Switzerland.

M. HENSON WOOD, Jr., *Primary Examiner.*

M. Y. MAR, *Assistant Examiner.*

U.S. Cl. X.R.

239—311, 339; 222—193; 266—23